US005255373A

United States Patent [19]

Brockmann et al.

[11] Patent Number: 5,255,373

[45] Date of Patent: Oct. 19, 1993

[54] DECREASING AVERAGE TIME TO ACCESS A COMPUTER BUS BY ELIMINATING ARBITRATION DELAY WHEN THE BUS IS IDLE

[75] Inventors: Russell C. Brockmann; Leith L. Johnson; William S. Jaffe, all of Fort Collins, Colo.

[73] Assignee: Hewlett-Packard Company, Palo Alto, Calif.

[21] Appl. No.: 741,712

[22] Filed: Aug. 7, 1991

[51] Int. Cl.[5] .............................................. G06F 13/36

[52] U.S. Cl. ................................ 395/325; 364/228.3; 364/242.6; 364/242.92; 364/DIG. 1

[58] Field of Search .............. 395/325, 725, 275, 425, 395/775, 650, 395; 340/825.5; 370/85.1, 85.2

[56] References Cited

U.S. PATENT DOCUMENTS

| | | | |
|---|---|---|---|
| 3,886,524 | 5/1975 | Appelt | 364/200 |
| 4,320,457 | 3/1982 | Tanikawa | 364/200 |
| 4,661,905 | 4/1987 | Bomba et al. | 364/200 |
| 4,864,291 | 9/1989 | Korpi | 340/825.5 |
| 4,993,023 | 2/1991 | Phinney | 370/85.13 |
| 5,072,363 | 12/1991 | Gallagher | 395/725 |
| 5,129,090 | 7/1992 | Bland et al. | 395/725 |

*Primary Examiner*—Michael R. Fleming
*Assistant Examiner*—Gopal C. Ray
*Attorney, Agent, or Firm*—Augustus W. Winfield

[57] ABSTRACT

A method and apparatus to improve computer bus access time. A bus is described which has sequential control states and fixed transaction times. Without the invention, arbitration may be delayed as the bus sequences through control states. With the invention, arbitration is immediate if the bus is idle. When any transaction is initiated, a counter is initialized to the number of control states in the standard transaction time. If the counter reaches zero, the bus is idle. If the bus is not idle, a sequence of bus control states is repeated. If the bus is idle, the bus is forced to remain in an arbitration state, thereby enabling any subsequent arbitration to take place immediately.

5 Claims, 5 Drawing Sheets

DECREASING AVERAGE TIME TO ACCESS A COMPUTER BUS BY ELIMINATING ARBITRATION DELAY WHEN THE BUS IS IDLE

FIELD OF INVENTION

This invention generally relates to computer systems and more particularly, relates to decreasing the time required to access a computer data bus or network system.

BACKGROUND OF THE INVENTION

Modern computer systems often have a plurality of "intelligent" devices interconnected by a high speed data communications link. These can comprise computer busses or computer networks. For the purposes of this description the term "bus" will be used interchangeably for both networks and busses. Within a computer, multiple processors may use an internal data bus to communicate with each other, with shared memory and with shared peripheral devices. Typically only one device can "talk" or "transmit" on the bus at one time. If several devices simultaneously contend for access to the bus, the system must provide an arbitration method for deciding which device is granted access. In addition, network systems must provide a means to separate various control functions, either by providing physically separate signal lines or by time multiplexing over shared signal lines.

U.S. application Ser. No. 07/694,265 filed Apr. 29, 1991 by William S. Jaffe, Russell C. Brockmann, and Leith L. Johnson entitled "Quadrature Bus Protocol for Carrying out Transactions In A Computer System" (hereinafter referred to as the Jaffe-1 application) is specifically incorporated herein by reference for all that it discloses.

The Jaffe-1 application describes a computer bus system interconnecting processors, I/O devices and memory. The system bus architecture is divided into an address/control bus (address bus) and a memory data bus (data bus). The address bus has the necessary signals to initiate all transactions on the system bus. In addition, data associated with an "I/O transaction" (defined later) is transferred on the address bus. Memory transactions consist of four address bus control states followed at some fixed time by four control states on the data bus.

In the Jaffe-1 application and in this application, the word "agent" refers to any general device connected to the system bus which is capable of contending for access to the system bus. Agents might be processors, I/O devices or any other "intelligent" devices. In this specification, an "I/O transaction" refers to a transaction between a processor and any device on the address bus other than memory. For example, a register in one processor being read by another processor is treated as an I/O transaction. I/O transactions may also include slower mechanical peripherals such as disk and tape drives.

In the Jaffe-1 application and in this application, the word "idle" means that no transactions are being processed by the system. In the Jaffe-1 application, agents desiring access to the system bus can contend for access only during the first of four address bus states. Thus, if the system is at the second, third, or fourth states at the time an agent desires access, the agent will have to wait three, two, or one state, respectively, before being able to request access. This delay time is present even if the system bus is idle. Performance may be improved by eliminating this delay time when the bus is idle.

SUMMARY OF THE INVENTION

The present invention overcomes the disadvantages and limitations of the prior art by decreasing the average time required to access a system bus by eliminating arbitration delay when the system bus is idle. The present invention describes a method and apparatus to detect when a system bus is idle and a method and apparatus to keep a system bus in an arbitration state when a system bus is idle. When an agent then requests access, arbitration occurs immediately without waiting for a partial cycle of additional bus states.

DETAILED DESCRIPTION OF THE PREFERRED EMBODIMENT OF THE INVENTION

Figure 1:
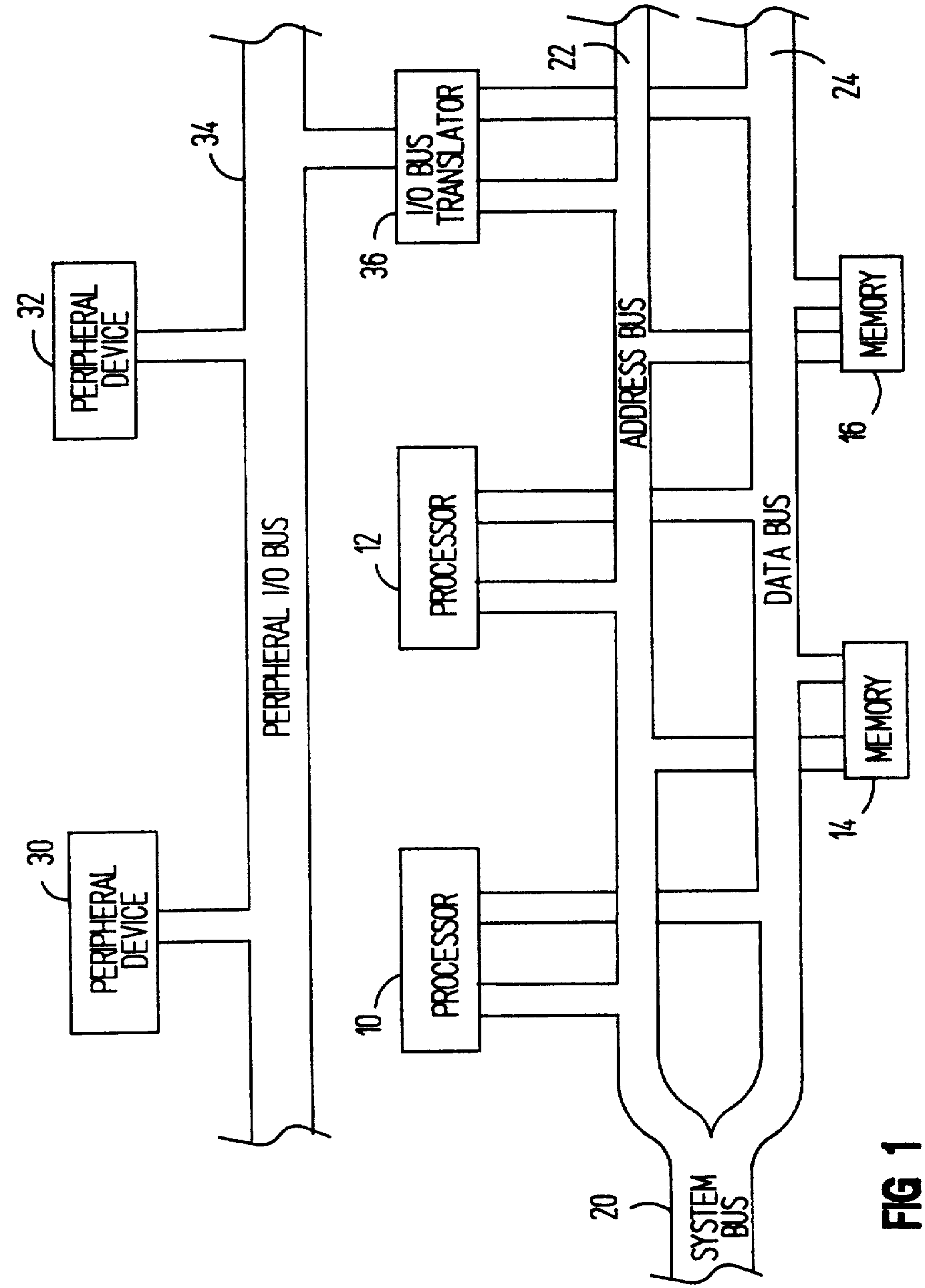
FIG. 1 is a block diagram illustrating a computer bus system with processors, memory, peripheral devices and separate address, data, and peripheral I/O busses.

FIG. 1 illustrates a computer bus system. Processors 1O, 12 and memory devices 14, 16 are interconnected by a system bus 20. The system bus 20 is divided into a separate address bus 22 and a data bus 24. All memory and I/O transactions are initiated on the address bus 22. Also, data associated with an I/O transaction is transferred on the address bus 22. Memory data is transferred on the data bus 24.

In FIG. 1, slower mechanical peripherals are illustrated by peripheral devices 30, 32. In general, peripheral devices are not connected directly to the system bus 20, but are connected to a separate peripheral I/O bus 34. The I/O bus translator 36 buffers timing and control between the system bus 20 and the peripheral I/O bus 34.

A processor requests data from memory by placing a memory address on the address bus 22. At some later time, memory responds with data on the data bus 24. The system bus 20 is a pipeline bus system in that multiple addresses can be sent out before the first data is returned. The time between data request and data return is fixed by the system (standard transaction time). As explained further below, all system bus transactions, whether memory or I/O, are completed in exactly the same standard transaction time.

When processors 10, 12 on the address bus 22 request data from peripheral devices 30, 32 on the peripheral I/O bus 34, the I/O bus translator 36 will return a "busy" data signal. This "busy" transaction requires the standard transaction time. When the peripheral device 30, 32 is ready, the I/O bus translator 36 signals the original requesting processors 10, 12 to initiate a new transaction. In the new transaction, data is returned by the bus translator 36, requiring the standard transaction time to complete the transaction. For any data request, a transaction (either "data ready" or "busy" data) is completed in the standard transaction time.

Figure 2:
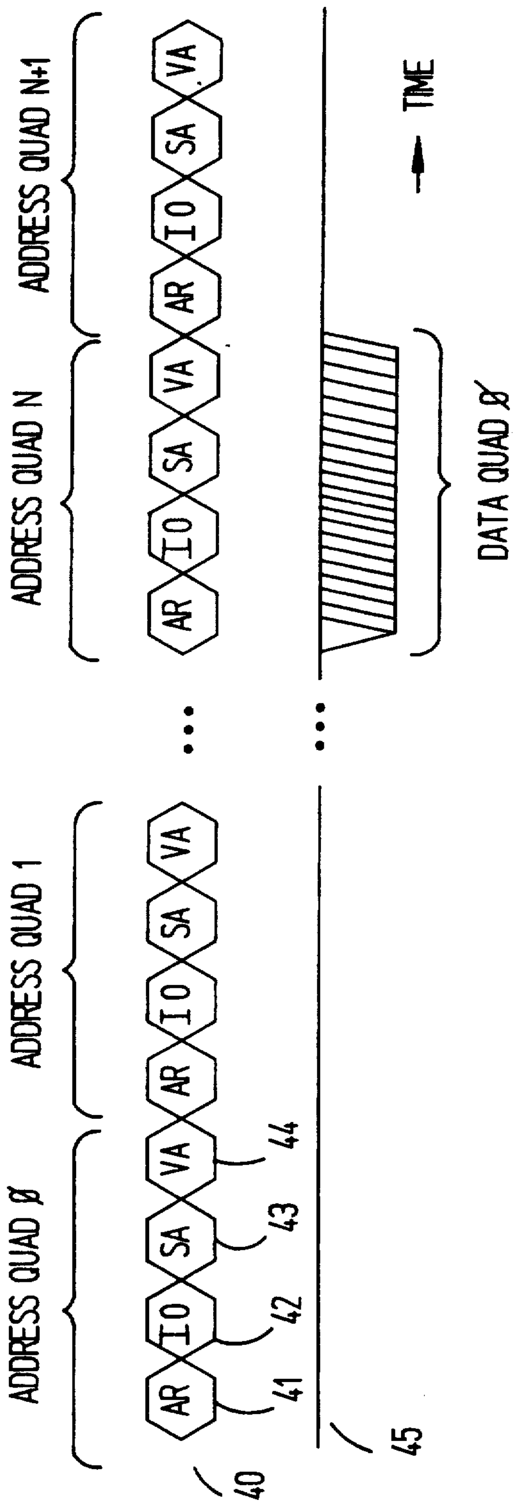
FIG. 2 is a timing diagram illustrating cycles of states on an address bus and data on a separate data bus.

FIG. 2 illustrates system bus timing. Address bus timing 40 is split into repeated groups of four control states. Each group of four control states is called a quad. The four address bus control states are the arbitrate (AR) state 41, I/O (IO) state 42, slave address (SA) state 43, and virtual address (VA) state 44. Arbitration of contention for the system bus occurs only during the arbitrate state. I/O data is transferred on the address bus during the I/O state. Addresses for transactions between "master processors" and "slave processors" are transmitted during the slave address state. Virtual memory addresses are transmitted during the virtual address state. The Jaffe-1 application provides more detail on the functions of the four address bus states.

FIG. 2 illustrates the delay between address quads and corresponding data quads. By way of example, assume that a processor requests memory data during address quad 0. At some fixed time later during the four states corresponding to address quad N, data quad 0 is transferred on the data bus in response to the request for data during address quad 0. Note that it is not necessary for data quads and address quads to be perfectly aligned. That is, data is returned in groups of four states but the first control state for the four data states is not required to be the arbitrate state 41.

Figure 3:
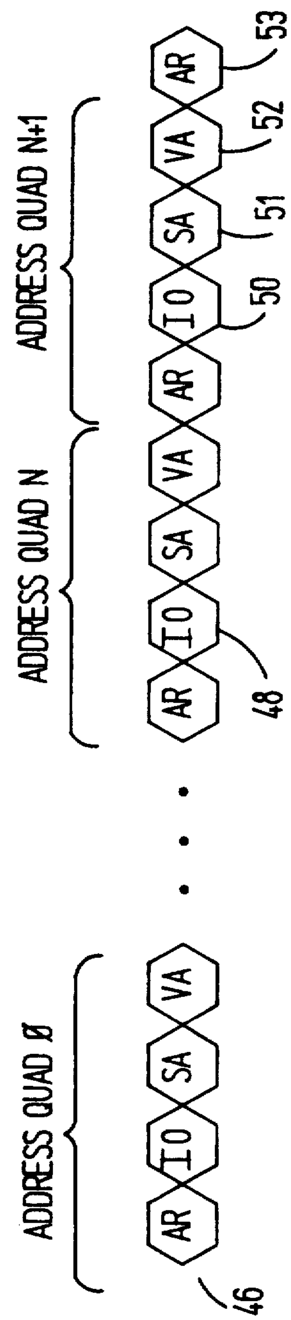
FIG. 3 is a timing diagram illustrating I/O data and also illustrating the wait time which is reduced by the present invention.

FIG. 3 illustrates the delay between address quads and data transferred by an I/O transaction. By way of example, assume that a processor initiates an I/O transaction during address quad 0. If the data is requested from a device on the address bus, the appropriate slave device will place data on the address bus during the I/O state of address quad N (state 48). If the data is requested from a peripheral I/O device, the I/O bus translator 36 (FIG. 1) will transfer "busy" data during state 48. At some later time, the I/O bus translator 36 (FIG. 1) will signal the requesting processor to again arbitrate for access to the address bus so that data can be transferred.

FIG. 3 also illustrates the problem being solved by the present invention. Again, by example, assume that a processor requests I/O data during address quad 0. Assume further that no agent requests access to the system bus during the time between address quad 0 and address quad N. During this time, the address bus cycles through each address state but there are no address bus transactions being initiated. At the end of address quad N, there are no transactions in process. The system bus is then idle. Without the present invention, an agent desiring to access the system bus during the second state after address quad N (state 50), would find the address bus in an I/O state. The agent would then have to wait for completion of an I/O state 50, a slave address state 51 and a virtual address state 52 before being allowed to arbitrate for access at the next arbitration state 53. The improvement of the present invention is eliminate this delay when the system bus is idle.

Figure 4:
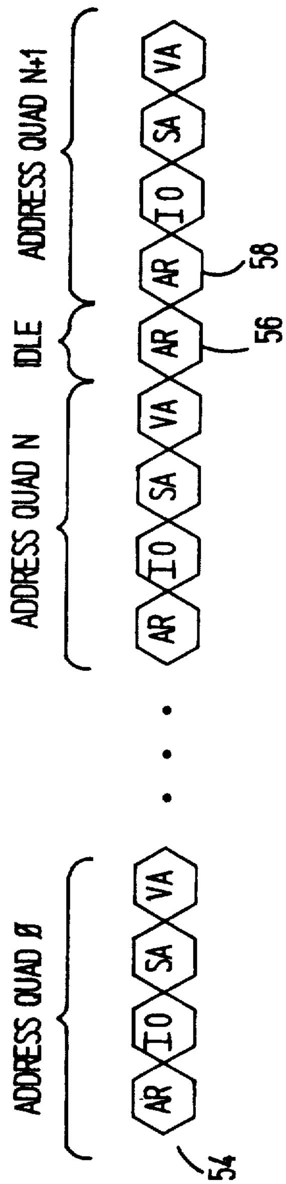
FIG. 4 is a timing diagram illustrating repeated arbitration states during system bus idle time in accordance with the present invention.

FIG. 4 illustrates bus timing with the present invention implemented. In FIG. 4, the timing diagram of FIG. 3 has been modified to illustrate idle detection and inhibition of the transition of the address bus out of the arbitration phase when the system bus is idle. Again, by example, assume that a processor initiates an I/O transaction during address quad 0 and that no other agent requests access to the system bus during the time between address quad 0 and address quad N. The present invention detects the idle state 56 and forces the address bus to remain in repeated arbitration states. If an agent then requests access to the system bus (for example, during state 58) the agent will immediately find the address bus in an arbitration state without having to sequence through other states. State 58 in FIG. 4 corresponds to state 50 in FIG. 3. In FIG. 3, the requesting agent must wait until state 53 before arbitrating for access. In FIG. 4, arbitration for access is immediate.

Figure 5:
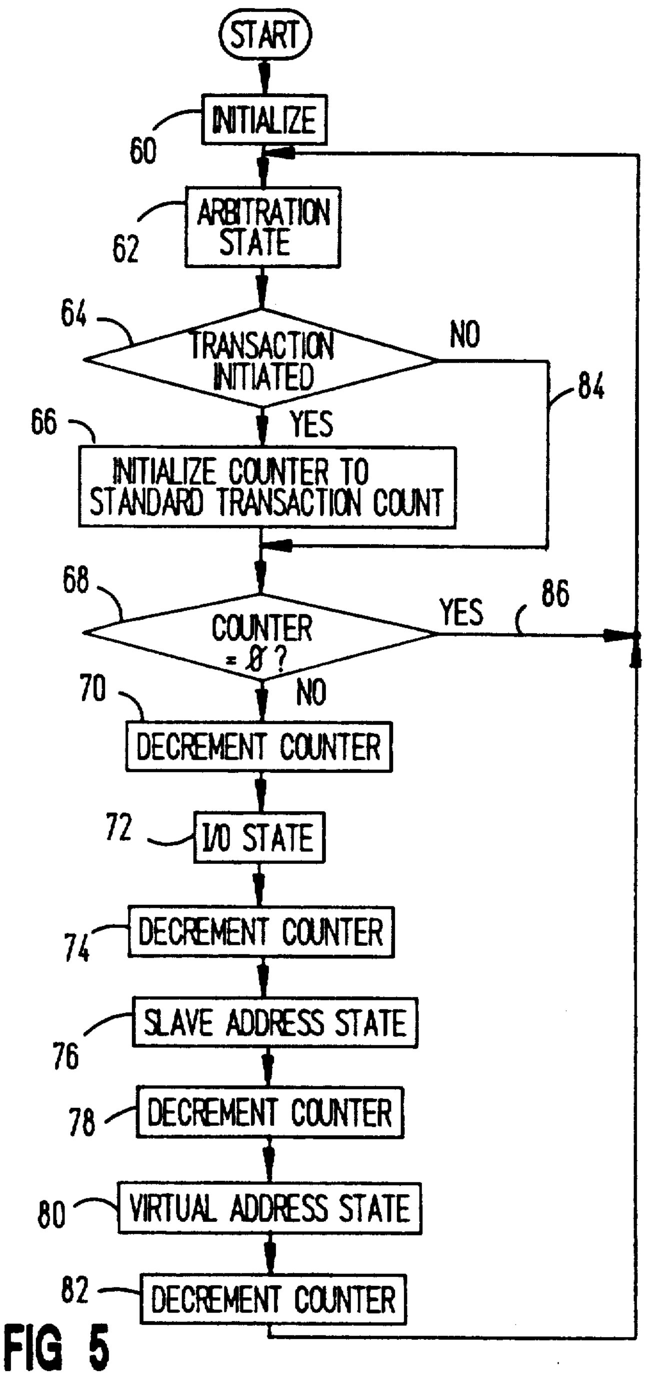
FIG. 5 is a flow chart illustrating a method for performing the present invention.

FIG. 5 is a flow chart illustrating a method to detect when the system bus 20 is idle. The standard transaction count is the number of address bus control states in the standard transaction time. Since all transactions take exactly the standard transaction time, detecting when the system bus is idle can be accomplished by counting address bus control states after each transaction is initiated. After initialization (step 60), the address bus goes to the arbitration state (step 62). During arbitration state (step 62), agents can request access to the system bus and access is granted to one requesting agent. If a transaction is initiated (decision step 64), then a counter is initialized to the standard transaction count (step 66). If a transaction is initiated and the counter is initialized to the standard transaction count, the path is through steps 70–82 until the counter is decremented to zero. If no transaction is initiated (decision step 64), the counter initialization (step 66) is bypassed (path 84). At decision step 68, if the counter is at zero, the system bus must be idle and the result of decision step 68 will be path 86 returning the address bus to another arbitration state (step 62). As long as the system bus is idle, the address bus will cycle through steps 62, 64, path 84, step 68 and path 86 back to step 62. If an agent requests access to the system bus and is granted access to the system bus, the counter is initialized to a value equal to the standard transaction count (step 66).

As long as the counter is non-zero, a transaction is in process. The result of decision step 68 will then be step 70. The address bus then cycles through the I/O state (step 72), the slave address state (step 76) and the virtual address state (step 80) before returning to the arbitration state (step 62). The counter is decremented at each address bus state (steps 70, 74, 78, 82). If any new transactions are initiated before the counter decrements to zero, the counter is again initialized to a value equal to the standard transaction time (step 66). If the counter reaches a value of zero all transactions are complete and the system bus is again idle.

Figure 6:
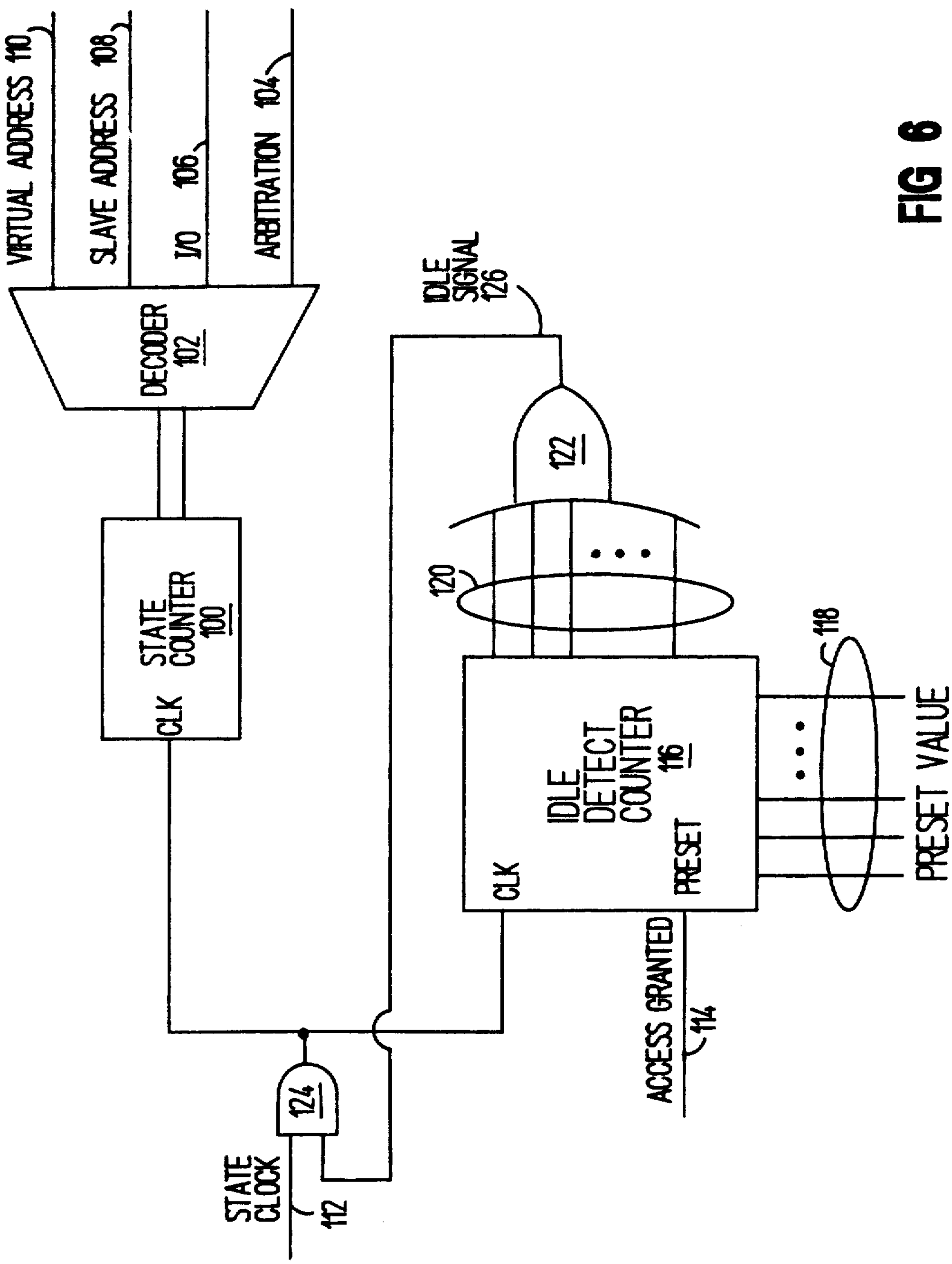
FIG. 6 is a schematic diagram illustrating an implementation of the present invention.

FIG. 6 illustrates a circuit capable of detecting whether the system bus is idle and inhibiting transition from the arbitration state to another state when the system bus is idle. Referring back to FIG. 1, only processors 10 and 12 in FIG. 1 initiate transactions on system bus 20. The bus translator 36 and memory devices 14 and 16 respond after fixed times. Therefore, the circuitry in FIG. 6 is contained only in processors 10 and 12 in FIG. 1. Continuing with FIG. 6, a state counter 100 and decoder 102 provide state signals 104, 106, 108, 110. That is, decoder 102 decodes a 2-bit encoded output from state counter 100 into 4 individual state control lines (104, 106, 108 and 110). State signals 104, 106, 108, 110 correspond to the arbitration state, I/O state, slave address state and virtual address state respectively. Each state signal 104, 106, 108, 110 is driven to logical 1 during the corresponding address bus state. For example, state signal 110 is logical 1 during the arbitration state.

The idle detect counter 116 is initialized to a preset value 118 whenever an access granted signal 114 is generated. The access granted signal 114 is generated during an arbitration state if an agent is granted access to the system bus. As will explained later, the preset value 118 is equal to the number which is the next integral multiple of four greater than or equal to the number of states in the standard transaction time.

The output of a logical "AND" gate 124 is a clock signal for both the state counter 100 and the idle detect counter 116. Each time the output of the logical "AND" gate 124 is driven to logical 1, the state counter 100 is incremented and the idle detect counter 116 is decremented.

The idle detect counter 116 output lines 120 drive the inputs of a logical "OR" gate 122. The output of the logical "OR" gate 122 drives the idle signal 126. The idle signal 126 will be logical 0 only if the idle detect counter 116 is at a count value of zero (no output lines 120 are at logical 1). When the idle detect counter 116 is at a count value of zero, the idle signal 126 is at logical 0 and the logical "AND" gate 124 inhibits the state clock 112 from incrementing the state counter 100 and decrementing idle detect counter 116.

The circuit illustrated in FIG. 6 requires the preset value 118 to be an integral multiple of four. The system bus must be in the arbitration state when idle detect counter 116 reaches a value of zero. Since the idle detect counter 116 is preset during the arbitration state, then the preset value 118 must be an integral multiple of four. Thus, when the system bus is idle (idle detect counter 116 is at zero), the state counter 100 is in the arbitration state and remains in the arbitration state. When an agent is granted access to the system bus, the access granted signal 114 presets the idle detect counter 116 to a non-zero value. The output of the logical "OR" gate 122 is then logical 1 and the logical "AND" gate 124 permits the state clock 112 to increment the state counter 100 to the next state and to decrement the idle detect counter 116.

From the preceding description, it can be seen that the present invention overcomes a disadvantage and limitation in the prior art by eliminating a delay in computer bus access time. The invention generally applies to any computer bus or network system which has a sequence of control states.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. In a computer system having a plurality of agents interconnected by a bus, wherein said bus has a plurality of sequential control states, a method of decreasing the time required to access said bus when said bus is idle, said method comprising the steps of:

(a) arbitrating for access to said bus during a first control state of said plurality of control states by agents requesting access to said bus, wherein access to said bus may be granted when said bus is not idle;

(b) detecting during said first control state, by a detector within each agent in said plurality of agents, whether said bus is idle, wherein said detector autonomously determines when said bus is idle independent of said bus;

(c) repeating the sequence of control states, within each agent in said plurality of agents, if said bus is not idle; and (d) inhibiting transition to another control state, within each agent in said plurality of agents, if said bus is idle so as to maintain said bus in said first control state, thereby eliminating arbitration delay by enabling instantaneous access to said bus if an agent in said plurality of agents arbitrates for access when said bus is idle.

2. A method as in claim 1, wherein said detector is a counter, the method further comprising the steps of:

(a) requesting data by an agent gaining access to said bus;

(b) receiving data by said requesting agent, said data being ready after a predetermined number of control states;

(c) initializing said counter, within each agent in said plurality of agents, during said first control state if any agent in said plurality of agents arbitrates for access to said bus;

(d) counting each control state in said sequence of control states until said predetermined number of control states has transpired; and (e) inhibiting transition from said first control state to another control state, within each agent in said plurality of agents, if said counter has completed counting said predetermined number of control states.

3. A method as in claim 2 wherein said sequence of control states has a length of four control states.

4. A computer system having a plurality of agents interconnected by a bus, said computer system comprising:

state counter means, within each agent, for generating each control state in said plurality of sequential control states, wherein arbitration for access to said bus occurs during a first control state of said plurality of sequential control states and wherein access to said bus may be granted when said bus is not idle;

detection means, within each agent, for detecting whether said bus is idle during said first control state, said detection means autonomously determining when said bus is idle independent of said bus; and inhibiting means, connected to said detection means and to said state counter means, for inhibiting transition to another control state in said plurality of sequential control states if said bus is idle, thereby maintaining said bus in said first control state.

5. A computer system as in claim 4 wherein any transaction on said bus is completed within a predetermined number of said control states, said detection means comprises:

idle detect counter means for counting control states in said plurality of sequential control states;

initialization means for initializing said idle detect counter means whenever any agent in said plurality of agents arbitrates for access to said bus and gains access to said bus; and wherein said inhibiting means inhibits transition to another control state in said plurality of sequential control states until said predetermined number of control states have transpired after initialization of said idle detect counter.

* * * * *